(12) United States Patent
Quintana et al.

(10) Patent No.: US 7,805,114 B1
(45) Date of Patent: Sep. 28, 2010

(54) IN SITU RE-CONFIGURABLE WIRELESS COMMUNICATIONS SYSTEM (IRCWCS)

(75) Inventors: W. Vincent Quintana, Bath, ME (US); Michael J. Rinaldi, Boovdoin, ME (US); Mark A. Norton, Thomaston, ME (US); Scott Houston, Topsham, ME (US)

(73) Assignee: Bath Iron Works Corporation, Bath, ME (US)

( * ) Notice: Subject to any disclaimer, the term of this patent is extended or adjusted under 35 U.S.C. 154(b) by 1066 days.

(21) Appl. No.: 10/303,750

(22) Filed: Nov. 26, 2002

Related U.S. Application Data

(60) Provisional application No. 60/396,079, filed on Jul. 17, 2002.

(51) Int. Cl.
*H04B 1/38* (2006.01)
(52) U.S. Cl. .............. 455/90.1; 455/41.2; 455/402; 455/575.2; 370/338
(58) Field of Classification Search .............. 370/338; 455/11.1, 41.2, 90.1, 402, 554.1, 555, 575.2
See application file for complete search history.

(56) References Cited

U.S. PATENT DOCUMENTS

| | | | |
|---|---|---|---|
| 3,801,752 A * | 4/1974 | Gdovichin | 191/12.2 R |
| 4,976,387 A | 12/1990 | Spianti | |
| 5,124,915 A | 6/1992 | Krenzel | |
| 5,146,611 A * | 9/1992 | Stolarczyk | 455/40 |
| 5,305,244 A | 4/1994 | Newman et al. | |
| 5,404,577 A * | 4/1995 | Zuckerman et al. | 455/66.1 |
| 5,533,097 A | 7/1996 | Crane et al. | |
| 5,594,498 A | 1/1997 | Fraley | |
| 5,675,807 A | 10/1997 | Iswandhi et al. | |
| D385,855 S | 11/1997 | Ronzani | |
| 5,691,713 A | 11/1997 | Ishida | |
| D387,898 S | 12/1997 | Ronzani | |
| 5,699,244 A | 12/1997 | Clark, Jr. et al. | |
| D390,552 S | 2/1998 | Ronzani | |
| 5,719,743 A | 2/1998 | Jenkins et al. | |
| 5,719,744 A | 2/1998 | Jenkins et al. | |

(Continued)

OTHER PUBLICATIONS

"Case Study—Shipbuilder Trims Inspection and Troubleshooting Time by 70%," ViA, Inc. web site (www.via-pc.com), May 2000 (precise date of publication unknown), published by ViA, Inc., Burnsville, Minnesota, May 2000.

(Continued)

*Primary Examiner*—Charles N Appiah
*Assistant Examiner*—Jaime M Holliday
(74) *Attorney, Agent, or Firm*—Kaye Scholer LLP

(57) ABSTRACT

In Situ Re-Configurable Wireless Communications System (IRCWCS) in combination with a wearable computer provides an individual user at a public gathering place, fixed facility or non-stationary object with new and enhanced capabilities. In one embodiment of the invention, the re-configurable wireless communication system includes a portable wireless access unit and a Long Range Ethernet (LRE) network switch that connects to an existing LAN. A bridge device such as an LRE puck connects the portable wireless access unit to the LRE network switch through a communications infrastructure. A wearable computer in wireless communication with the portable wireless access unit using a radio frequency link allows communication of video, voice and data to and from the existing LAN through the LRE network switch. The LRE network switch couples to a central command station through the existing LAN.

28 Claims, 8 Drawing Sheets

U.S. PATENT DOCUMENTS

| | | | |
|---|---|---|---|
| 5,726,660 | A | 3/1998 | Purdy et al. |
| 5,757,339 | A | 5/1998 | Williams et al. |
| 5,774,338 | A | 6/1998 | Wessling, III |
| 5,787,298 | A | 7/1998 | Broedner et al. |
| 5,831,198 | A | 11/1998 | Turley et al. |
| 5,844,656 | A | 12/1998 | Ronzani et al. |
| 5,844,824 | A | 12/1998 | Newman et al. |
| 5,886,739 | A | 3/1999 | Winningstad |
| 5,893,037 | A | 4/1999 | Reele et al. |
| D411,179 | S | 6/1999 | Toyosato |
| 5,948,047 | A | 9/1999 | Jenkins et al. |
| 5,963,631 | A * | 10/1999 | Fazio et al. ............ 379/202.01 |
| 5,983,073 | A | 11/1999 | Ditzik |
| 5,991,831 | A | 11/1999 | Lee et al. |
| 5,995,936 | A | 11/1999 | Brais et al. |
| 5,999,952 | A | 12/1999 | Jenkins et al. |
| 6,006,286 | A | 12/1999 | Baker et al. |
| 6,023,241 | A | 2/2000 | Clapper |
| 6,029,183 | A | 2/2000 | Jenkins et al. |
| 6,049,813 | A | 4/2000 | Danielson et al. |
| 6,055,372 | A | 4/2000 | Kardach et al. |
| D423,761 | S | 5/2000 | Ng et al. |
| 6,057,966 | A | 5/2000 | Carroll et al. |
| 6,061,411 | A | 5/2000 | Wooten |
| 6,064,566 | A | 5/2000 | Agata et al. |
| 6,219,697 | B1 | 4/2001 | Lawande et al. |
| 6,219,736 | B1 | 4/2001 | Klingman |
| 6,249,427 | B1 | 6/2001 | Carroll |
| 6,260,202 | B1 | 7/2001 | Villalobos et al. |
| 6,285,757 | B1 | 9/2001 | Carroll et al. |
| 6,292,213 | B1 | 9/2001 | Jones |
| 6,305,587 | B1 | 10/2001 | Miller |
| 6,307,526 | B1 | 10/2001 | Mann |
| 6,324,053 | B1 | 11/2001 | Kamijo |
| 6,356,968 | B1 | 3/2002 | Kishon |
| 6,522,531 | B1 | 2/2003 | Quintana et al. |
| 6,563,532 | B1 | 5/2003 | Strub et al. |
| 6,574,672 | B1 * | 6/2003 | Mitchell et al. ............. 709/250 |
| 2002/0001289 | A1 * | 1/2002 | Liebenow ................... 370/328 |
| 2002/0054174 | A1 | 5/2002 | Abbott et al. |
| 2002/0074370 | A1 | 6/2002 | Quintana et al. |
| 2002/0095662 | A1 * | 7/2002 | Ashlock et al. ............. 717/136 |
| 2002/0152285 | A1 * | 10/2002 | Wheeler et al. ............. 709/218 |
| 2003/0072571 | A1 | 4/2003 | Wechsler et al. |
| 2003/0119490 | A1 * | 6/2003 | Mohammed ................ 455/414 |
| 2003/0126298 | A1 * | 7/2003 | Redford et al. ............. 709/250 |
| 2003/0142652 | A1 * | 7/2003 | Ting et al. ................... 370/338 |
| 2004/0174251 | A1 * | 9/2004 | Fisher et al. ........... 340/310.01 |

OTHER PUBLICATIONS

Steve Ditlea, "The PC goes ready-to-wear," IEEE Spectrum,. vol. 37, No. 10, Oct. 2000, (pp. 34-39—available online at www.spectrum.ieee.org).

Lisa Guernsey, "Wearable Computers for the Working Class", N.Y. Times, Dec. 14, 2000.

Anne Eisenberg, "The World Through PC Powered Glasses", N.Y. Times, Dec. 14, 2000.

* cited by examiner

IN SITU RE-CONFIGURABLE WIRELESS COMMUNICATIONS SYSTEM (IRCWCS)

CROSS-REFERENCE TO RELATED APPLICATIONS

This application claims the benefit under 35 U.S.C. §119 (e) of U.S. provisional application Ser. No. 60/396,079 entitled "INTERIOR RE-CONFIGURABLE WIRELESS COMMUNICATIONS SYSTEM (IRCWCS)" filed on Jul. 17, 2002, by W. Vincent Quintana et al., which application is incorporated by reference herein.

BACKGROUND OF THE INVENTION

1. Field of the Invention

The present invention relates generally to an In Situ Re-Configurable Wireless Communications System (IRCWCS), and more particularly to a computer and wireless communication system for providing emergency and non-emergency wireless communications at public gatherings, fixed facilities and non-stationary objects.

2. Background of the Invention

On a fixed facility such as a building or a non-stationary object such as a ship, many emergency and non-emergency situations may require the use of a communication system that permits the exchange of video, voice, and data information between a central command station and individuals trying to handle the situation. One such situation may be the outbreak of a fire on a ship or other confined space such as an offshore oilrig. The outbreak of a fire can simultaneously cause fear, panic, and chaos within a matter of seconds. Fire fighters need to react fast to stop the fire from spreading. Challenges faced by fire fighters include restricted escape areas and not knowing the extent of the fire. The delays in fighting a fire caused by these challenges can result in a heavy loss of merchandise and equipment and may even result in the loss of life.

The traditional equipment used by fire fighters consists of a fire suit, a helmet, air packs, and a wireless radio. In addition, some fire fighters wear location devices that enable the central command station and team leader to monitor the location of the fire fighters. However, there exists a continuing need to provide more information to fire fighters such as the precise location of fires within a confined area and the extent of damage that a fire has caused. In addition, there exists a continuing need for more effective communication between the central command station, team leaders and fire fighters. For example, if a team leader could transmit a plan view of the structure where a fire has broken out that displays the precise areas where the fire is located, as well as unobstructed escape routes, fire fighters would be able to extinguish the fire in a more expedient and safe manner.

Another situation in which the communication of video, voice and data information can be very useful is in diagnosing and maintaining electrical, electronic, mechanical, and electro-mechanical devices in a fixed facility or on a non-stationary object. Because of the complexity of modern day systems, there is a constant need to perform testing and other diagnostic procedures both to ensure that components are operating properly and to determine the precise cause of a problem when a malfunction occurs. There are countless technical manuals and other sources of information that must be referenced by the technician conducting these tests and other diagnostic procedures. Communications with another technician or an engineer at a central command station to diagnose and repair the problem may be critical in such situations.

A sentry guarding a public gathering place, fixed facility or non-stationary object can also benefit by interchanging video, voice and data communication with other sentries and the central command station. The sentry at a remote guardpost or onboard a ship has to guard against many sophisticated threats. The potential threat may approach the public gathering place, fixed facility or non-stationary object by land (e.g. walking or in a motorized vehicle), by sea (e.g. in a fast, small boat or in a heavily armored ship) or by air (e.g. airplane, helicopter, or glider). The sentry must guard against threats using any of these possible intrusion routes. In addition to their duties of guarding the public gathering place, fixed facility or non-stationary object, the sentry may be assigned to a guard post at which they monitor and record incoming and outgoing individuals and vehicles. The sentry at the guard post must be able to identify all potential threats from possible unauthorized persons or impostors trying to gain entry to the public gathering, fixed facility or non-stationary object. The traditional equipment used by a sentry in his task of surveillance consists of binoculars, a lethal weapon such as a pistol, rifle, or other type of gun, perhaps a non-lethal weapon, and a voice communication device that enables the sentry to provide a description of the threat to the central command station and other sentries. However, there exists a continuing need for more effective two-way communication between the central command station and sentries. For example, if the central command station in real time could transmit a plan view of the public gathering place, fixed facility or ship showing the location of the threat or threats to all sentries, the sentries would be aware of the potential threat's movements and coordinate their response to intercept the threat in a more expedient and safe manner. Thus, a system and method is needed that can increase the communication and exchange of critical information between a sentry and a central command station and other sentries.

Paramedics, SWAT team members, and members of chemical-biological response teams would gain new and enhanced capabilities if they were able to transmit and receive video, voice, and data communication between each other and a central command station.

For each of the situations described above, in order to provide the needed video, voice and data information, a computer system can couple to the central command station through a Local Area Network (LAN). However, in many situations the LAN in the public gathering place, fixed facility or non-stationary object may have been partially damaged or be inaccessible to the individual. In such a situation, a wireless communication system that is portable and can be instantaneously connected to the public gathering place, fixed facilities or non-stationary object LAN would be highly desirable. Furthermore, it would be desirable if such a wireless communication system provided backup standalone capabilities in case of surreptitious loss of network connectivity and allowed individual users to seamlessly transit in and out of network coverage areas.

BRIEF SUMMARY OF THE INVENTION

The problems noted above are solved in large part by a method and apparatus for using an IRCWCS in combination with a wearable computer to provide an individual in a public gathering place, fixed facility or non-stationary object with new and enhanced capabilities. A wearable computer is a computer or data device that may be physically worn on the body of the person operating the computer. In one embodiment of the invention, the re-configurable wireless communication system includes a portable wireless access unit and a long-range Ethernet (LRE) network switch for coupling to an existing LAN. A bridge device such as an LRE puck is preferably used to connect the portable wireless access unit to the LRE network switch through a communications infrastructure, such as sound powered phone circuitry or other suitable communications medium. A wearable computer in wireless communication with the portable wireless access unit using a radio frequency link preferably allows communication of video, voice and/or data to and from the existing LAN through the LRE network switch. In one embodiment, the LRE network switch couples to a central command station through the existing LAN.

In an embodiment of the invention, the communications infrastructure comprises sound powered phone circuitry including a sound powered phone switchboard connected through sound powered phone circuit infrastructure to a sound powered phone jack box. In an alternative embodiment of the invention, the sound powered phone circuitry is a sound powered X40J phone line including "salt" and "pepper" connectors. Other suitable communications infrastructures might include phone lines, power cables, railroad tracks, the steel infrastructure of buildings or any conductive medium.

NOTATION AND NOMENCLATURE

Certain terms are used throughout the following description and claims to refer to particular system components and processes. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF ILLUSTRATIVE EMBODIMENTS

Figure 1:
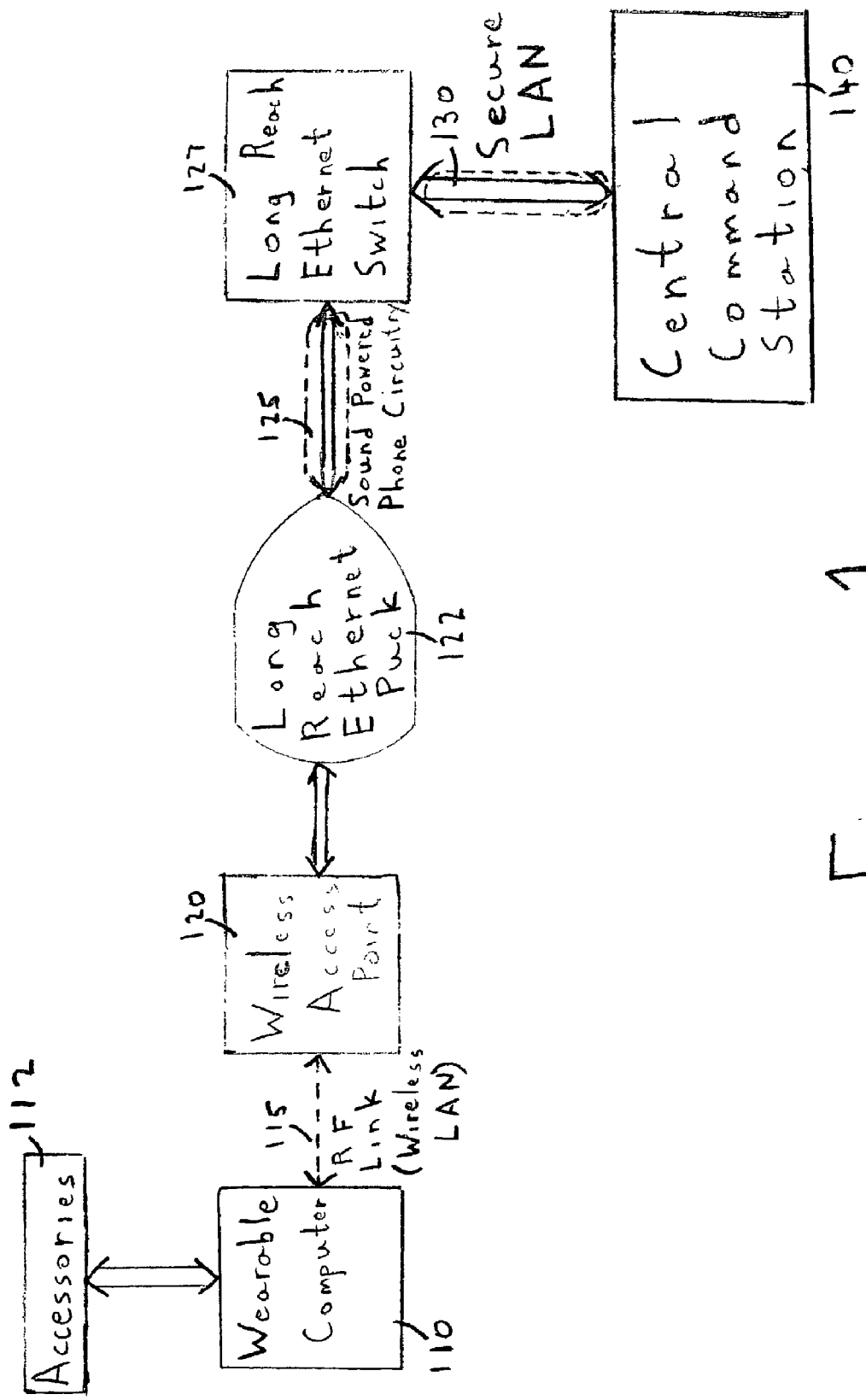
FIG. 1 shows an embodiment of an IRCWCS including a wearable computer and accessories coupled to a central command station through a LAN.

Turning now to FIG. 1, one embodiment of the present invention comprises an IRCWCS including a wearable computer 110 coupled to a plurality of accessories 112. In the embodiment shown in FIG. 1, the computer 110 is a wearable computer but in alternative embodiments of the invention any device with suitable features and functionality of the wearable computer as described below may be used. A wearable computer is a computer that may be physically worn on the body of the person operating the computer. When there is insufficient space to set up a laptop or desktop computer, a wearable computer is preferred. Furthermore, wearable computers may be used when the individual wearing the computer requires maximum mobility while keeping the computer readily accessible. The wearable computer 110 and accessories 112 couple to a Central Command Station 140 through a Radio Frequency (RF) link 115 connected to a wireless access point 120, LRE puck 122, LRE switch 127, and secure LAN 130. Central Command Station 140 might be, for example, an access control and/or security management system, or other such suitable support system. RF link 115 may be a wireless LAN or a stand-alone system that is periodically updated at a central database to provide maximum mobility to the wearable computer user. The messaging protocol used by the RF link wireless LAN 115 may be Ethernet, Institute of Electrical and Electronics Engineers (IEEE) 802.11, or Bluetooth, for example. In one embodiment, the wearable computer may have PCMCIA slots that accommodate a wireless LAN card and other components. Using, for example, an Aironet wireless communication system, available from Cisco Systems, Inc., 170 West Tasman Drive, San Jose, Calif., 95134, computer 110 is able to transmit and receive video, voice and data over a wireless LAN connection using the IEEE 802.11 protocol.

In alternative embodiments, at locations where the use of a wireless LAN is not feasible or available, long-range wireless communication, as available from BreezeCom, 5858 Edison Place, Carlsbad, Calif., 92008, for example, may be used to establish wireless communication between wearable computer 110 and wireless access point 120. If long-range wireless communication is not available, satellite based communication, as available from DirecPC, 11717 Exploration Lane, Germantown, Md., 20876, for example, may be used to establish wireless communication. In addition to these examples, any other type of wireless communication may be used with the present invention, such as IP-based telephony.

Accessories 112 that couple to the wearable computer 110 may include an image acquisition device such as a video camera, night vision goggles, or radar. In one embodiment, access controller and card readers used by the sentry engaged in guard post duties can also couple to the wearable computer. The wearable computer also connects to a Hypersonic-Sound™ system, High Intensity Directional Acoustics (HIDA), or PlanarMagnetic™ technology system, and a harness. In one embodiment, the wearable computer includes a display unit and a network device that allows communication with the wireless access point 120. In an alternative embodiment, the network device and display unit may couple through an external connection to the wearable computer 110. Finally, in another alternative embodiment of the invention, an audio-video communication device such as a radio transmitter-receiver, cell phone, IP telephony device, legacy communications device or pager also couples to wearable computer 110.

As shown in FIG. 1, central command station 140 receives video, voice and data and communications through RF link wireless LAN 115 and wireless access point 120. An IEEE 802.11 wireless network can operate in either Ad-Hoc mode or Infrastructure mode. Preferably, Infrastructure mode means that all traffic passes through the wireless access point device 120, while Ad-hoc mode allows networked devices to communicate directly with each other without having to go through a wireless access point device. The wireless access point device 120 may be a bridge device that connects a wireless network 115 to a wired network 130 transparently using current Ethernet protocols, such as 802.3(X) et al. Preferably, communication is possible between both LANs in both directions. In an embodiment of the invention, the network adapter or wireless access point device 120 uses wireless encryption protocols to encrypt transmitted messages and decrypt received messages. In another embodiment, the network adapter or wireless access point device 120 may encrypt each message using strong authentication and/or an alternative encryption algorithm. The encryption algorithm may incorporate 64 bit or 128 bit level keys and thus each network adapter or wireless access point node should be at this same encryption level with the same 64 bit or 128 bit key to operate.

As shown in FIG. 1, a LRE puck 122 couples to the wireless access point device 120. While only one such LRE puck 122 is illustrated, one skilled in the art will appreciate that multiple LRE pucks 122 and associated apparatus may be supported by a system of the present invention. In an embodiment of the invention, the LRE puck 122 converts an Ethernet signal from wireless access point 120 to a Very-high-data-rate Digital Subscriber Line (VDSL) based signal capable of transmission over a designated communications infrastructure. For example, in the embodiment of FIG. 1, the communications infrastructure is illustrated as sound powered telephone circuitry 125. Alternatively, the infrastructure might include such media as the conductive infrastructure of a building or other facility, railroad tracks, cabling for power, phone, Internet, etc. Preferably, the present invention enables communication over a passive infrastructure that, unlike power transmission lines for example, might not otherwise carry an electrical signal and/or other means of communication.

LRE puck 122 might be a Cisco 575 LRE Customer Premise Equipment (CPE) device available from Cisco Systems, Inc., 170 West Tasman Drive, San Jose, Calif., 95134. The Cisco 575 LRE CPE device 122 can transmit a signal over ordinary telephone lines up to 5000 feet to the LRE switch 127. In one embodiment, LRE puck 122 allows Plain Old Telephone Service (POTS) voice information to share the same physical telephone line with LRE data transmit to LRE switch 127. Once POTS voice information and LRE data reach LRE switch 127 through sound powered phone circuitry 125, a LRE POTS splitter (not shown in FIG. 1) separates the LRE data from POTS voice information. The LRE POTS splitter transmits high-frequency LRE data to LRE switch 127 and low-frequency POTS information to a private branch exchange (PBX) switch (not shown in FIG. 1). In an embodiment of the invention, the LRE POTS splitter is a Cisco LRE 48 POTS Splitter device available from Cisco Systems, Inc., 170 West Tasman Drive, San Jose, Calif., 95134.

Turning now to LRE switch 127 shown in FIG. 1, LRE data received through sound powered phone circuitry 125 is transmitted to central command station 140 through secure LAN 130. In an embodiment of the invention, the LRE Switch 127 is a Cisco Catalyst 2900 LRE XL switch device available from Cisco Systems, Inc., 170 West Tasman Drive, San Jose, Calif., 95134. The Cisco LRE switch can support video, voice and data exchange rates up to 15 Mbits/sec over single pair telephone wiring. Further aspects of the Cisco 2900 LRE XL switch is described in greater detail in "Cisco Long-Reach Ethernet Solution," Cisco Product Catalog, July, 2002, which is wholly incorporated by reference herein.

Figure 2:
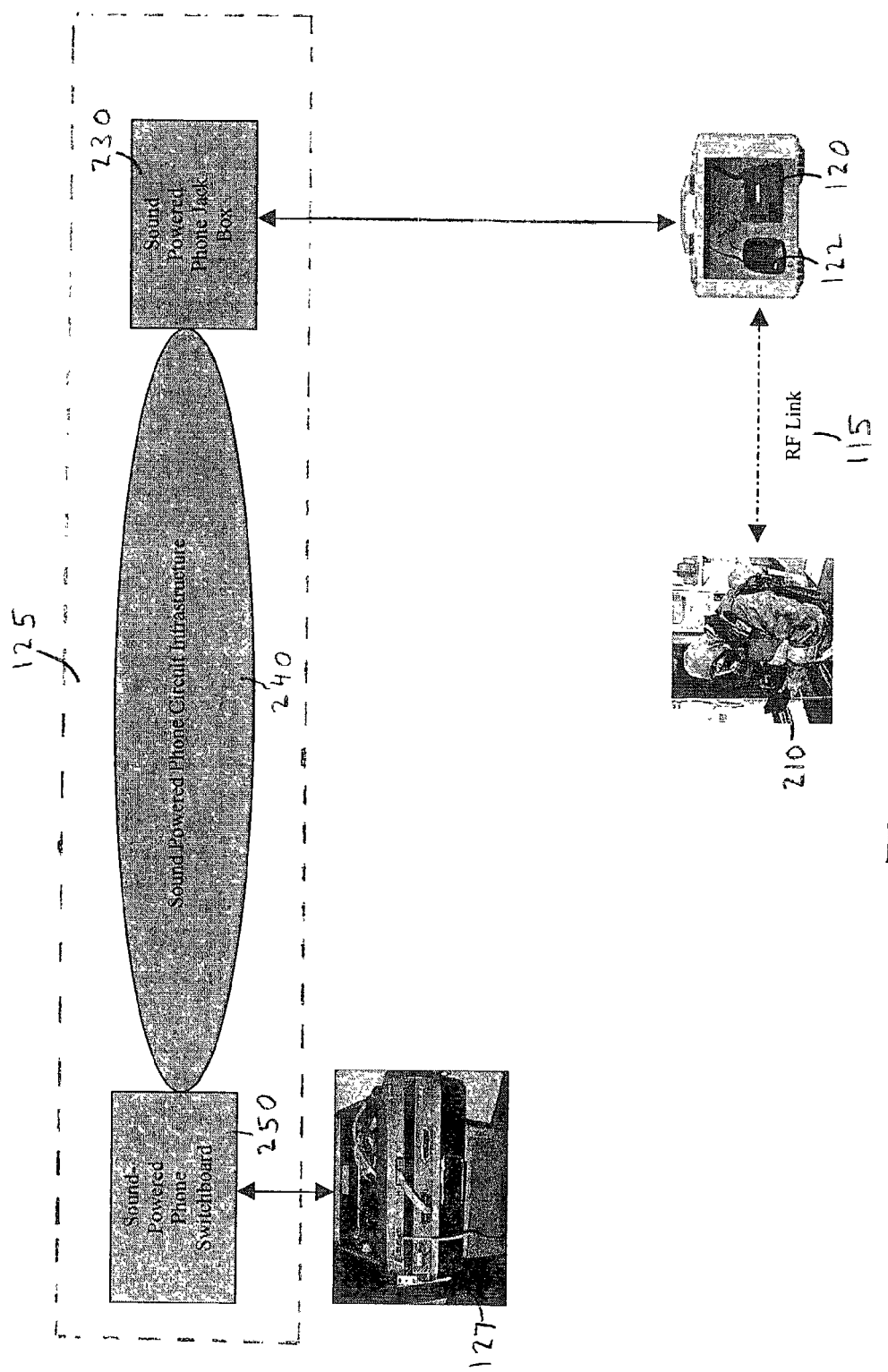
FIG. 2 shows an embodiment of the IRCWCS of FIG. 1 used by a fire fighter interconnected through sound powered phone circuitry and switchboard to a Long Reach Ethernet (LRE) switch.

Turning now to FIG. 2, one application of the IRCWCS for ship board damage control depicts a fire fighter interconnected through sound powered phone circuitry and switchboard 125 to a Long Reach Ethernet (LRE) switch 127. The fire fighter is shown using a computer 210 that may be a wearable computer. The computer couples through RF link wireless LAN 115 to wireless access point 120. Wireless access point 120 connects through LRE puck 122 to sound powered phone circuitry 125 that in the embodiment shown in FIG. 2 includes sound powered phone jack box 230, sound powered phone circuit infrastructure line 240, and sound powered phone switchboard 250. The fire fighter locates the nearest powered phone jack box 230 and plugs the LRE puck 122 into the phone jack box. The fire lighter is able to use the LAN on board the ship to communicate with other fire fighters on the ship and the central command station. Video, voice and data information from the wearable computer is transmitted and received through sound powered phone jack box 230, sound powered phone circuit infrastructure 240 and sound powered phone switchboard 250. Sound powered phone switchboard 250 couples to LRE switch 127 that then connects to the shipboard LAN (not shown in FIG. 2). In another embodiment, if sound powered phone circuitry 125 is damaged or inaccessible, the fire fighter can connect sound powered "salt" and "pepper" phone line X40J (not shown in FIG. 2) directly into LRE switch 127 and LRE puck 122. The fire fighter can carry the LRE puck 122 and the cable reel holding X40J phone line to a location near the site of the fire. The fire fighter can use wireless access point 120 connected to LRE puck 122 to pass video, voice and data information from his wearable computer to anywhere that the LRE switch LAN connection can reach.

FIGS. 1-8 will be used to describe the wearable computer in combination with the IRCWCS and accessories to provide enhanced capabilities to sentries guarding a public gathering place, fixed facility or non-stationary object. As shown in FIGS. 1 and 2, the IRCWCS includes wearable computer 110 connected to central command station 140 through wireless access point device 120 and LAN 130. Wearable computer 110 is configured to execute software applications that seamlessly integrate with various client computer systems and server databases in central command station 140. In one aspect of the invention, software executing on the wearable computer connected to a LAN through the IRCWCS in combination with access control hardware permits a sentry at a guard post to provide access to authorized individuals and vehicles and electronically record their entry and exit. Other software applications including image enhancement software executing on the wearable computer permits a video camera to transmit digital video to a monitoring information server in the central command station for storage and analysis. Finally, software applications along with hardware to collect data about potential threats and perform biometric analysis allow determination of a language understood by the threatening individual. The data available to the biometric analysis software application may include facial features of the threatening individual, words spoken by the potential threat, the predominant ethnic group at the location of the public gathering, fixed facility or non-stationary object and the language used by that ethnic group, among others.

Conversation from the potential threat up to about 500 yards away can be heard using an amplified passive receiver such as Big Ears® available from Crystal Partners, Incorporated. In one embodiment, the amplified receiver can be coupled to the wearable computer and headphones through wireless connections. The conversation may then be used by the biometric analysis software application for determination of a language understood by the threatening individual. The receiver may be a snap-together parabolic dish with advanced audio circuitry including band equalizers to adjust for specific sound frequencies. The receiver can be mounted on a tripod or stabilized platform on the non-stationary object or fixed facility. In another aspect of the embodiment, each sentry can couple to multiple amplified passive receivers to eavesdrop on conversation from potential threats located in any part of the zone of protection around the public gathering place, non-stationary object or fixed facility.

Once the language used by the potential threat is determined and if such is necessary, language translation software executing on the wearable computer can be used to communicate with the threat. The language translation software in combination with other elements of the invention can broadcast an advisory warning message to the potential threat using Hypersonic-Sound™ system, High Intensity Directional Acoustics, or PlanarMagnetic™ technology system. The language translation software may be Mobile Language Translation System available from ViA, Inc. for speech translation technology.

The HyperSonic-Sound™ system can be provided source acoustic data from analog or digital recording and playback devices, microphones, or transducers that are connected to an HSS ultrasonic amplifier. The voice from the audio source is converted to an ultrasonic signal by the transducer (i.e. emitter). The transducer may be a thin film transducer that uses polymer diaphragm structure. The transducer in one embodiment can meet the extended high frequency output demands of the Super Audio compact discs by performing beyond 50 KHz in bandwidth. Because the ultrasonic energy generated by the transducer is highly directional, it preferably forms a virtual column of sound directly in front of the transducer. Along the column of ultrasonic sound, the air is creating new sounds similar to the voice and/or source originally converted to the ultrasonic signal. In an HSS system the sound does not spread in all directions like the sound from a conventional loudspeaker. Instead, it preferably stays concentrated tightly inside the column of ultrasonic energy. In order to hear the sound, a person's ears must be in line with the column of ultrasound or substantially parallel to a hard surface from which the ultrasound can reflect.

Multiple sentries at points throughout a ship can perform access control as well as observation, evaluation and adjudication using the systems and methods described. The sentries are preferably interconnected by a network coupled to a central command station. Within a prescribed 500 yard zone of protection, or other established zone, each sentry equipped with an ESS is capable of tracking one or more potential threats, notifying the central command station, warning the potential threats, deterring and engaging the potential threats. The number of sentries used to protect particular areas or facilities may vary. For example, on smaller ships, the zone of protection may be generated using a HIDA system in which multiple sentries each coupled to a HIDA array and coordinating sound generation through their wearable computers produce needed acoustic output. For larger ships such as an aircraft carrier, multiple HIDA arrays may be needed to generate the appropriate level of sound for the outer perimeters of the zone of protection. In a preferred embodiment, HIDA arrays would be coupled to the ships hull structure and remotely controlled from a remote source for beamsteering (i.e. aiming). Remote control from a remote source such as central command station would reduce the need for sentry operations.

Figure 3:
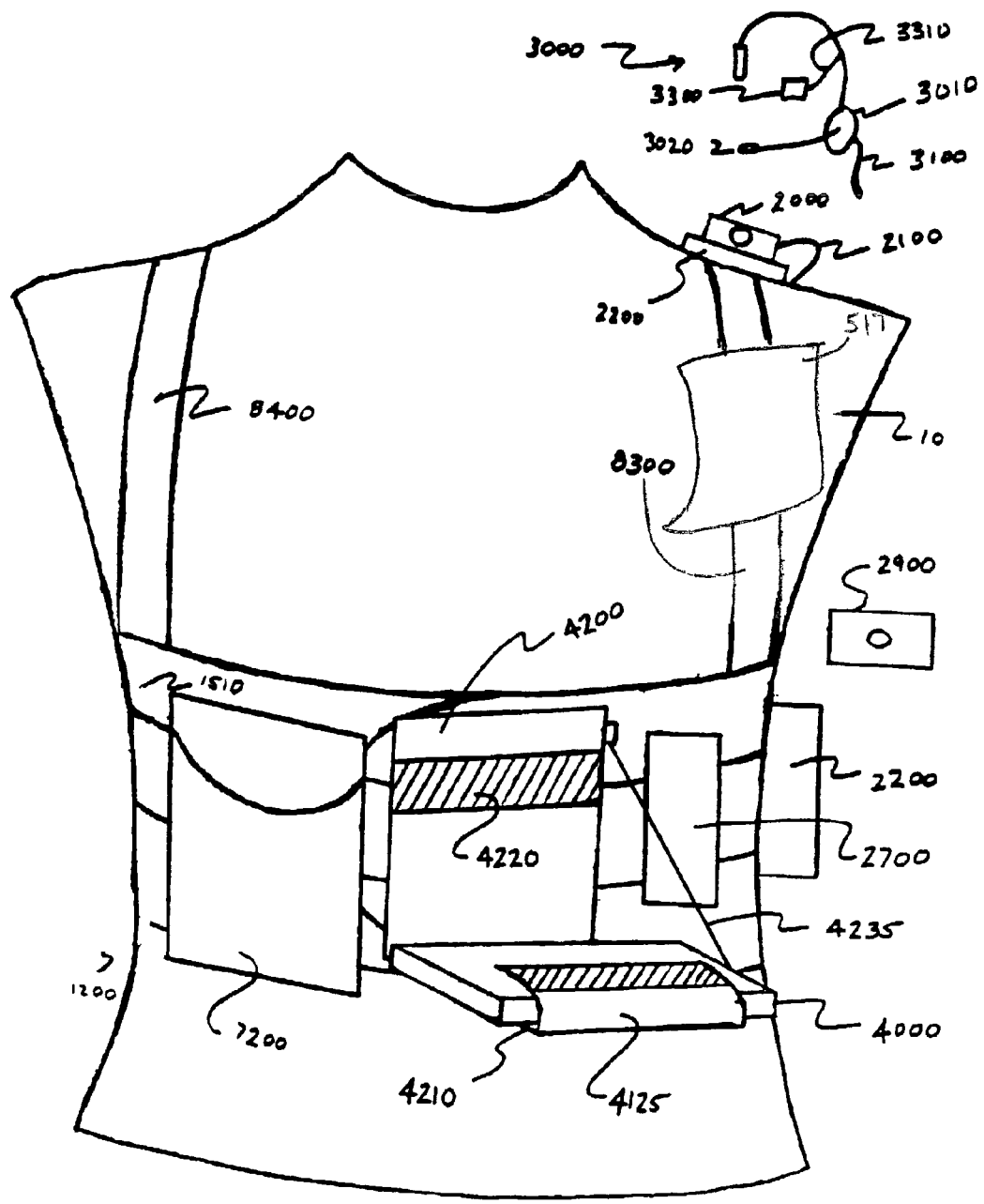
FIG. 3 is a front view of an embodiment of a wearable computer as worn on the body of a person.
Figure 5:
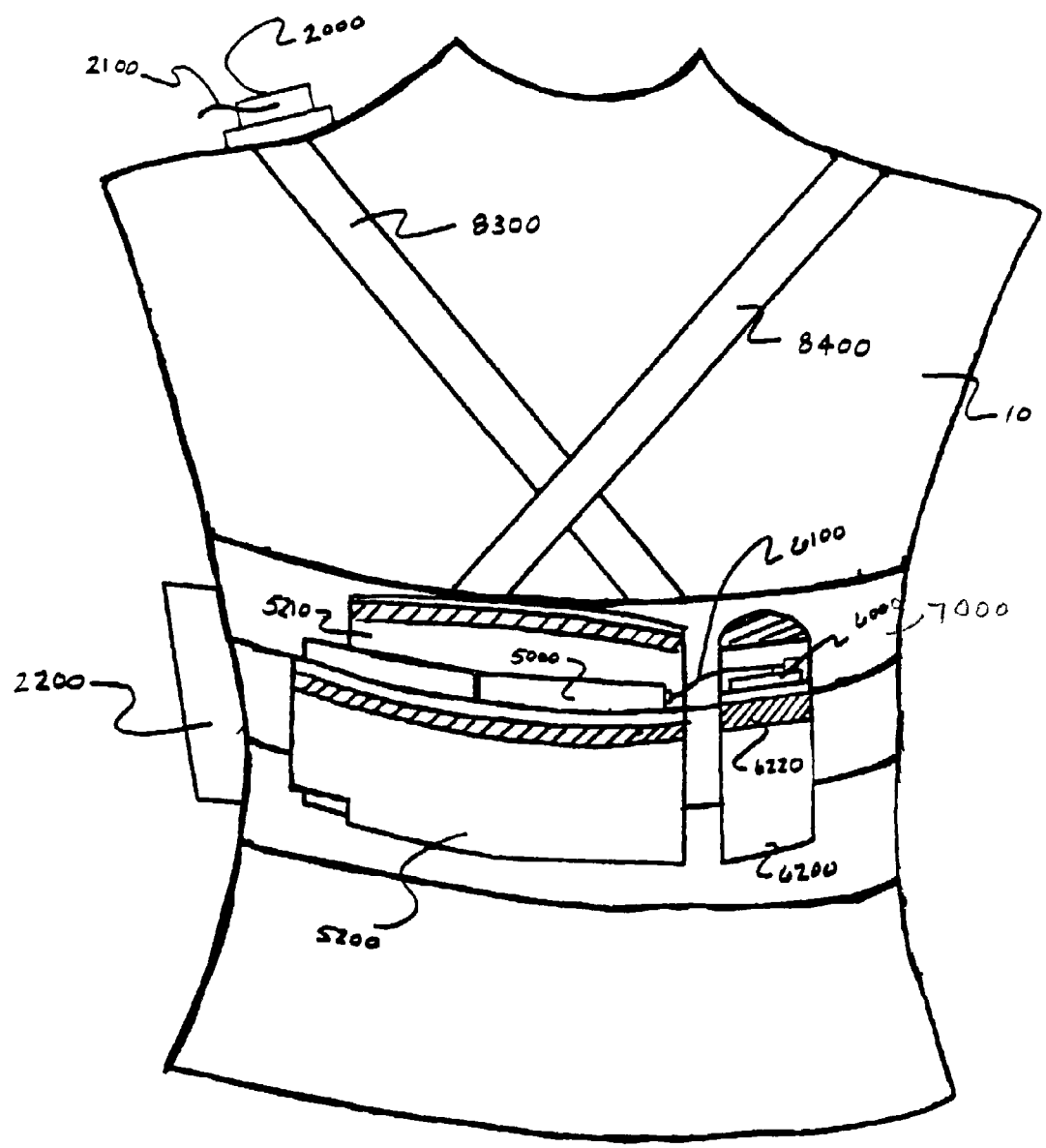
FIG. 5 is a rear view of the embodiment of the wearable computer shown in FIG. 3 as worn on the body of a person.
Figure 7:
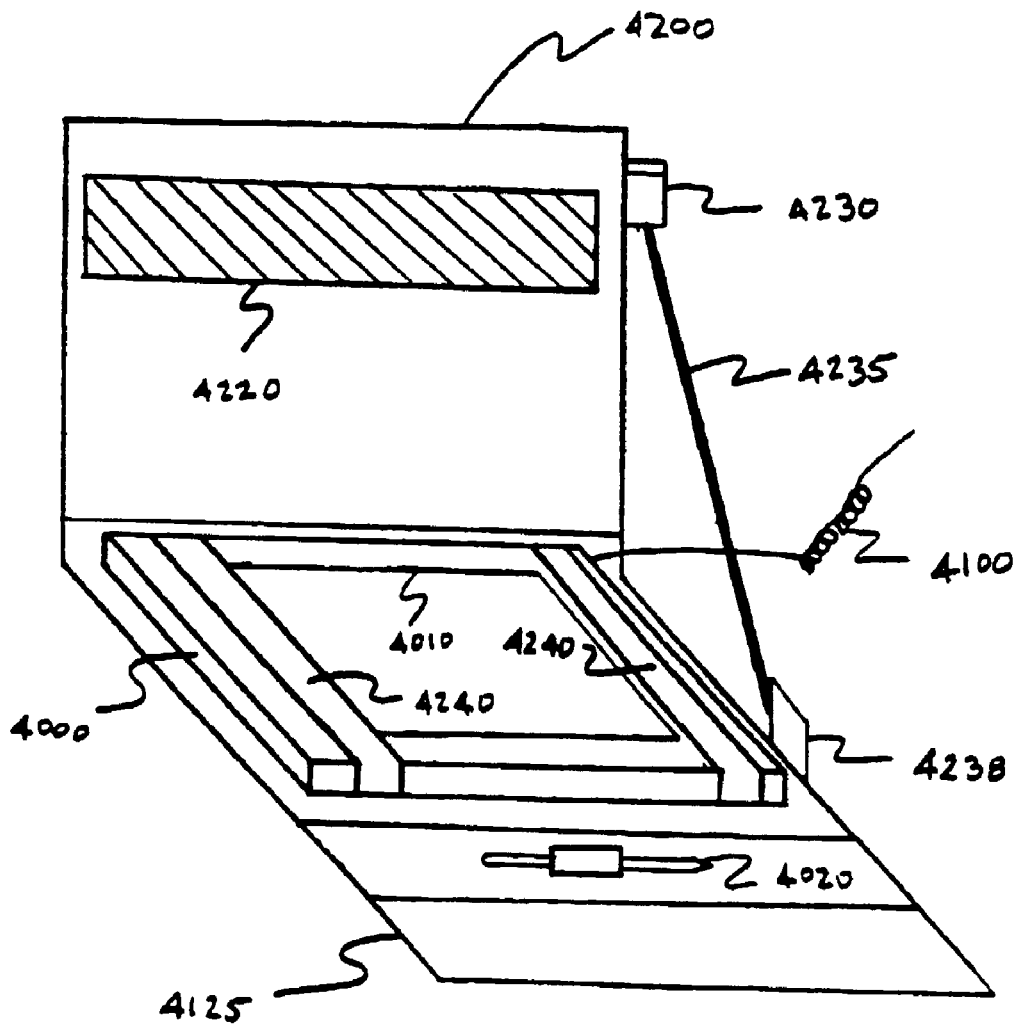
FIG. 7 is a diagram of an embodiment of a display unit stored in a housing.

Referring to FIGS. 3, 5 and 7, the present invention comprises a video camera 2000 that may be stored in a video camera case 2200, an infrared camera 2900, an infrared camera case 2700, a headset 3000 with a head mounted display (HMD) 3300, a display unit 4000 stored in a display housing 4200, a computer 5000 stored in a computer housing 5200, a battery 6000 stored in a battery housing 6200, an accessory pouch 7200, a communication device 517, and a harness 8000 that may support any or all of the foregoing and/or other components from the body 10 of the person using the present invention.

While numerous wearable computers may be used as computer 5000, computer 5000 is a ViA IIB or ViA IIC (Transmeta processor) wearable computer, available from ViA, Inc., 12550 West Frontage Road, Ste. 201, Burnsville, Minn. 55337, or a ViA IIR wearable computer, available from General Dynamics Information Systems, 8800 Queen Avenue South, Bloomington, Minn., 55431. The ViA IIR is a modified version of the ViA IIB. In an alternative embodiment, the wearable computer may be a ViA "Stick" computer.

In another embodiment of the present invention, computer 5000 may be the ViA IIC, which incorporates a Transmeta Crusoe processor. Like the ViA IIB, the ViA IIC has two PCMCIA slots to accommodate wireless communication and other components. The ViA IIC is desirable because it uses a faster processor, provides increased RAM, provides increased hard-drive space, provides an increased Level II cache, produces less heat, and is capable of using a variety of operating systems including Windows 95, Windows 98, Windows 2000, Windows NT 4.0, Windows XP, LINUX, Sun, Hewlett-Packard, and IBM operating systems. In yet another embodiment of the invention, a ViA IIR may be used as computer 5000. The ViA IIR is desirable because it is "ruggedized" to withstand a greater shock than a conventional wearable computer can be expected to withstand. The ViA IIR takes the basic core unit of a commercial ViA IIB and consolidates it into a 3.8"×5.9"×1.6" box machined from a solid block of aluminum that is sealed to be water tight and able to withstand shock. A hollow cell is machined into the box containing the motherboard, processor, chipset, RAM and all other associated electronic components. This cell is waterproof and the motherboard is designed to use the thermal mass of its container as a heat sink.

The ViA IIR is Microsoft Windows 9X compatible, and currently uses Windows 2000 as its operating system. In addition, the ViA IIR is also capable of using Windows NT 4.0 as its operating system. The ViA IIR has an internal PCMCIA slot that may accommodate a wireless LAN card and other components. Using, for example, an Aironet wireless communication system, available from Cisco Systems, Inc., 170 West Tasman Drive, San Jose, Calif., 95134, computer 5000 is able to transmit and receive video, voice and data over a WLAN connection using the IEEE 802.11 protocol. The ViA IIR is modified for use according to the present invention to accommodate two PCMCIA cards.

Computer 5000 includes one or more adapters (not shown) to facilitate the exchange of video, voice and data between the video camera 2000, infrared camera 2900, night vision goggles, HSS system, HIDA, or any of the other accessories mentioned above and computer 5000. The adapter used may be a common adapter that is characterized by PCMCIA, PCI, and PXI card-bus technology. The adapter may also be characterized by any other technology that will facilitate the exchange of video, voice and data between the accessories and computer 5000. The use of PCMCIA technology generally will facilitate most information collection and analysis applications including, without limitation, the information required for biometric analysis. However, when dealing with high voltages and frequencies, the use of PCMCIA technology may be limited because of size restrictions and the ability of PCMCIA technology to dissipate heat. In applications involving high voltages and frequencies, PCI technology is used. In this embodiment, a CardBus extender can be placed in the PCMCIA slot of computer 5000 and then connected to an external PCI card carrier (not shown) that can be powered by a DC battery power supply. The CardBus-PCI extender used in this embodiment can be supplied by Magma, Inc., 9918 Via Pasar, San Diego, Calif., 92126. In addition, a Card-Bus-PCI extender suitable for use with the present invention may be used.

In another embodiment of the present invention, as would be known to those skilled in the art, the accessories may be connected to computer 5000 using a USB, PCI, PXI, serial, IEEE 1394 (Firewire) or PCMCIA interface and any modifications necessary to allow computer 5000 to use a desired access protocol.

As shown in FIG. 5, battery 6000 supplies power to computer 5000 using power cable 6100. Battery 6000 is stored in battery housing 6200, which supports battery 6000 from harness 7000. In an embodiment of the present invention, battery 6000 is two Molicel ME202BB batteries, available from E-One Moli Energy Limited, North American Sales Office and Production Facility, Maple Ridge, BC, Canada, V2X 9E7. The Molicel ME202BB is preferred because of its high energy density characteristics and thermal resistance. The Molicel ME202BB is the battery that is shipped with the ViA IIB computer. The Energy Access SBS series smart battery charger that is also shipped with the ViA IIB computer is likewise preferred because it uses "smart charging technology" that allows the battery to be charged at various levels of discharge with diminished risk of developing battery "memory" or overcharging the battery. This battery supports Microsoft Windows Power Management, which will display the percentage of power remaining in the battery, can be set to send a warning message when the battery charge is reduced to a certain level, and allows the "hot swapping" of batteries. In addition, this battery includes a touch sensitive film switch on the battery itself with a relative power indicator.

Referring to FIG. 3, video camera 2000 and/or infrared camera 2900 can be used to collect video data that may be transmitted using wireless communication to the access control and security management system for use in decision-making and identification. Unless specified otherwise herein, the term "video" includes, without limitation, NTSC, PAL, H.320, H.323, H.324, T.120, or composite or component video as required. As shown in FIG. 3, video camera 2000 is mounted upon a left shoulder strap 8300 of harness 8000. However, camera 2000 may likewise be mounted upon right shoulder strap 8400 or at any other location suitable for collecting video data, such as mounted atop the array 420. Camera 2000 is secured to a camera mounting pad 2200 using elastic straps (not shown), but may also be secured to camera mounting pad 2200 using any other suitable fastening means including hook and piling fastener tape, snaps, buttons, zippers, and clips. Camera mounting pad 2200 is secured to shoulder strap 8300 using hook and pile fastener tape that is secured to the lower surface of camera mounting pad 2200 and the outer surface of shoulder strap 8300. However, any suitable fastening means may be used to secure camera mounting pad 2200 to shoulder strap 8300 including, without limitation, zippers, buttons, snaps, and clips.

Referring to FIG. 5, camera 2000 transmits video data to computer 5000 using video cable 2100. In one embodiment of the present invention, video cable 2100 is a USB cable. However, video cable 2100 may be any means suitable for transmitting video data including, without limitation, a USB v. 2.0 or "firewire" interface. In an embodiment of the present invention, camera 2000 is a 3Com Home Connect web camera, available from 3Com, Inc., 5400 Bayfront Plaza, Santa Clara, Calif., 95052-8145. The software drivers of this camera fully support Microsoft Windows "plug and play," which permits the "hot swapping" of USB devices. In addition to the 3Com Home Connect web camera, any camera suitable for collecting and transmitting real time video data may be used as camera 2000. Camera 2000 is characterized by features including low bandwidth, low light sensitivity, rugged construction, compatibility with existing interface ports, water resistance, thermal resistance to both high and low temperatures, shock resistance, and a low profile.

In another embodiment of the present invention, the sentry may use infrared camera 2900 to collect real time infrared videos and infrared images. These videos and images may be downloaded using wireless transmission to the central command station 140. Infrared camera 2900 can be stored in case 2700 supported from harness 8000. Infrared camera 2900 used in this embodiment may be either Heat Find or Video Therm series cameras available from Monroe Infrared Technologies, 62 Portland Road, Suite 6, P.O. Box 1058, Kennebunk, Me. 04043. Other suitable infrared cameras also may be used.

As shown in FIGS. 3 and 7, display unit 4000 is used to provide video, voice and data and information to the sentry wearing the present invention and to exchange video, voice and data and information between the sentry and central command station 140. Referring to FIG. 7, display screen 4010 of display unit 4000 utilizes a thin film transistor (TFT) touch sensitive display surface, thus combining both video and "mouse" functions into display unit 4000. The sentry using the present invention interfaces with display unit 4000 using a pen stylus 4020 on display screen 4010, by touching display screen 4010 with their finger, or by using a joy-stick mouse to navigate a pointer on display screen 4010. Display unit 4000 is stored in display housing 4200. Display unit 4000 is connected to computer 5000 using display cable 4100.

Display unit 4000 may be used by the sentry to view a plan of the fixed facility or non-stationary object for monitoring of the potential threats and location of other sentries. In addition, display unit 4000 may connect to video camera 2000 or infrared camera 2900 through wearable computer 5000 to identify and monitor enhanced images of the potential threats.

In an embodiment of the present invention, display unit 4000 is a ViA II PC Pen Tablet with an Indoor Readable display, available from ViA, Inc., 12550 West Frontage Road, Ste. 201, Burnsville, Minn. 55337. The Indoor Readable display is preferred because of its backlight feature. A Sunlight Readable display, also available from ViA, Inc., may be used as display 4000 in situations where the present invention is being used outdoors where sunlight may interfere with the ability of the sentry to view display screen 4010. In another embodiment of the present invention, a transflective screen, available from ViA, Inc., or a Hewlett Packard No Power display, available from Hewlett Packard, 3000 Hanover Street, Palo Alto, Calif. 94304-1185, may be used as display unit 4000.

As shown in FIGS. 3 and 7, display unit 4000 is stored in display housing 4200 to support display unit 4000 from harness 8000. As shown in FIG. 3, display housing 4200 is configured to permit display unit 4000 to be extended from the body 10 of the sentry when in use for hands-free operation and to permit display unit 4000 to be stored in a position flat against the body 10 of the sentry when not in use (not shown). In a embodiment of the present invention as shown in FIG. 7, the angle at which display unit 4000 extends from the body 10 of the sentry, and the angle at which display unit 4000 may be viewed when in use, may be adjusted through the use of a support cord 4235 and barrel stops 4230 and 4238. Using barrel stops 4230 and 4238, the length of support cord 4235 may be adjusted, thereby controlling the angle at which display unit 4000 extends from the body of the sentry. Another embodiment uses a fixed position hinge (not shown) to control angle.

Also as shown in FIG. 7, display 4000 is fastened to display housing 4200 using fastening straps 4240. Fastening straps 4240 are permanently secured to display housing 4200 at one end and removably fastened to display housing 4200 at the other end using hook and pile fastener tape or any other suitable fastening means including, without limitation, snaps, buttons and clips. In this embodiment of the present invention, display 4000 may be removed from display housing 4200 for use in displaying information to others by either unfastening fastening straps 4240 or sliding the display in a lateral direction when fastening straps 4240 are loosened.

Although not shown in FIG. 3 or 7, when display unit 4000 is not in use, display unit may be stored in a flat position against the body 10 of the sentry by folding a support flap 4210 inwards towards the body 10 of the sentry. A mounting strip made of hook and pile fastener tape is mounted upon the outer surface of a storage flap 4215 and mounting strip 4220. In addition to hook and piling fastener tape, any suitable fastening means may be used to secure storage flap 4125 to mounting strip 4220 including, without limitation, zippers, buttons, and snaps.

In another embodiment of the present invention, a head mounted display 3300 may be used in lieu of or in conjunction with display 4000. As shown in FIG. 3, head mounted display 3300 may be mounted on an arm 3310 extending from headset 3000. In addition, head mounted display 3300 may be incorporated into a pair of glasses. The use of head mounted display 3300 would enable the sentry to use "augmented reality" software applications. In an embodiment of the present invention, a Liteye 300, available from Liteye Microdisplay Systems, LLC, 12415 Dumont Way, Unit #103, Littleton, Colo. 80125, may be used as head mounted display 3300. In another embodiment, a display available from Microvision, Inc., 19910 North Creek Parkway, Bothell, Wash., 98011, may be used as head mounted display 3300. When the Microvision head mounted display or any other head mounted display that employs a retinal scan display technology is used, the data collected from the object of interest can be "superimposed" over the object of interest as the data is collected, enabling the sentry to view data as it is collected without having to look away from the object of interest. In yet another embodiment of the present invention, head mounted display 3300 can be modified Sony PLM-5700 PC Glasstron. Head mounted display 3300 used according to the present invention may use technology including, but not limited to, curvilinear prism technology, liquid crystal display technology, or retinal scan display technology.

The present invention likewise may incorporate a wrist mounted keyboard (not shown), a wrist mounted finger mouse (not shown), or any other ergonomically adapted keyboard or mouse (not shown).

Referring still to FIG. 3, headset 3000 is used to facilitate audio communication between the sentry and access control and security management system 140. Headset 3000 comprises a speaker 3010 and microphone 3020. Audio data may be transmitted from headset 3000 to computer 5000 using audio cable 3100. As discussed above, headset 3000 can further comprise a head mounted display.

In a preferred embodiment, headset 3000 is an ANC 100, available from Andrea Electronics Corp., 45 Melville Park Road, Melville, N.Y., 11747. In one embodiment, an analog audio cable (not shown) is used to connect headset 3000 to computer 5000. In another embodiment, a USB adapter C1-10166004 available from Andrea Electronics Corp. is used to permit headset 3000 to interface with computer 5000 using a USB interface. This embodiment uses digital audio, which can improve audio quality. In addition, any headset suitable for exchanging audio communication may be used as headset 3000.

Figure 8:
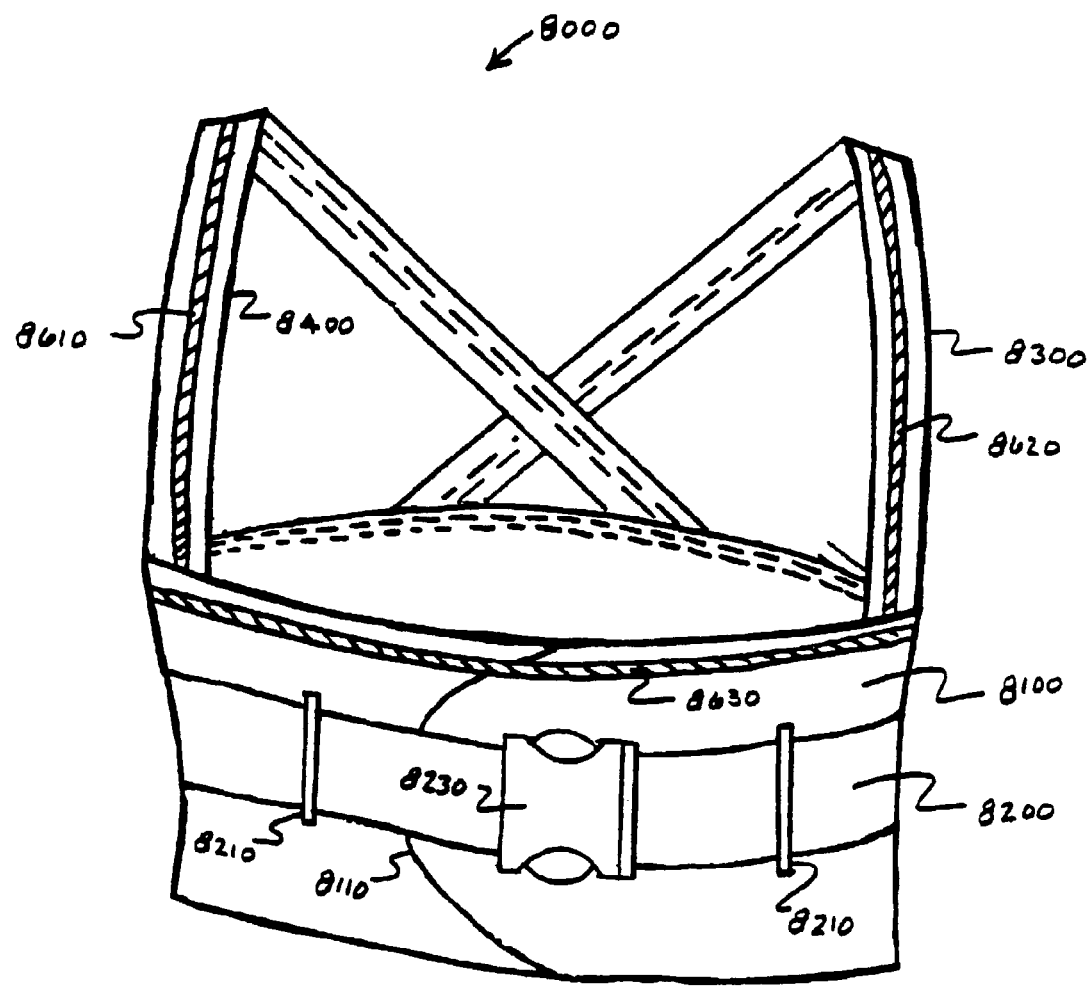
FIG. 8 is a diagram of an embodiment of an apparatus to support components from the body of a person in accordance with the present invention.

As shown in FIGS. 3, 5 and 8, harness 8000 is used to support video camera 2000, infrared camera 2900, display unit 4000, computer 5000, battery 6000, and accessory pouch 7200 from the body 10 of the sentry wearing the present invention. Referring to FIG. 8, an embodiment of harness 8000 is a modified "back support belt" commonly worn by warehouse workers to ease the strain of lifting and long hours standing on concrete floors. An inner belt 8100 is a typical adjustable back support belt with an outer hook and pile fastener tape surface. In addition to hook and piling fastener tape, any other method of fastening may be used such as buttons, snaps, and zippers. Inner belt 8100 is adjustable to many body types because it is fastened using a hook and piling fastener tape patch (not shown) located on the inside surface of an outer flap 8110. An adjustable outer belt 8200 constructed from nylon is positioned over inner back support belt 8100 and is held in place using support loops 8210 that are secured to the outer surface of inner belt 8200. Outer belt 8200 is adjustable and may have its end fastened to one another using clasp 8230 as shown in FIG. 10. The ends of belt 8200 may also be secured to one another using any other suitable fastening means including, without limitation, buckles, snaps, button, hook and pile fastener tape, and clips. Harness 8000 as shown has the added benefit of providing additional lumbar support to the sentry wearing the present invention. Harness 8000 can be supplied by Red Raven, 372 Boothbay Road, Edgecomb, Me. 04556.

Accessory pouch 7200 is an "accordion" pouch with two pockets and a hook and pile fastener tape flap. In addition to hook and pile fastener tape, any suitable fastening means including, without limitation, buttons, snaps, hooks, and clips may be used to close accessory pouch 7200.

Cameras 2000 and 2900, display unit 4000, computer 5000, battery 6000, and accessory pouch 7000 may be supported from outer belt 8200 by running outer belt 8100 through support loops (not shown) located on the inside surfaces of camera cases 2200 and 2700, display housing 4200, computer housing 5200, battery housing 6200, and accessory pouch 7200. In an embodiment of the present invention, hook and pile fastener tape patches sewn onto the support loops located on the inside surfaces of camera cases 2200 and 2700, display housing 4200, computer housing 5200, battery housing 6200 and accessory pouch 7200 prevent the various components from sliding about inner belt 8200 because the hook and pile fastener tape patches on the support loops adhere to the outer hook and pile fastener tape surface of inner back support belt 8100. This embodiment has the added benefit of allowing other components such as additional storage pockets to easily be supported from outer belt 8200. In addition, this embodiment allows for the reconfiguration, addition, or deletion of various components depending upon the sentry's needs. In addition to this embodiment, any fastening means including snaps, buttons, zippers and clips may be used to support the components from harness 8000.

As shown in FIG. 8, harness 8000 also comprises adjustable shoulder straps 8300 and 8400 that provide additional support for the sentry wearing the present invention. Shoulder straps 8300 and 8400 are adjusted so that inner back support belt 8100 is properly positioned on the sentry.

As shown in FIG. 8, cable conduits 8610 and 8630 are incorporated into harness 8000 to prevent the cables used in the present invention from causing inconvenience or snagging. As shown in FIG. 8, cable conduit 8630 runs along the upper edge of inner belt 8100 and cable conduit 8610 runs along the outside of shoulder strap 8300 and 8400. In addition to this embodiment, cable conduits may be positioned at any other suitable location in harness 8000.

Cable conduits 8610 and 8630 are constructed from two-sided hook and pile fastening tape. One edge of the tape is secured to harness 8000 using stitching or any other suitable fastening means including, without limitation, snaps, buttons, zippers, or clips. The other edge of the tape remains free. The cable to be passed through the conduit is rolled into the tape, enclosing the cable in the conduit. An advantage of using the hook and piling fastening tape in this embodiment is the ability to create an aperture at any point along the conduit to permit the cable to exit the conduit. Corresponding apertures may be made at other location throughout the cable conduits to permit the cables to be appropriately positioned.

In addition to the above example, any other suitable material may be used to construct cable conduits 8610 and 8630, and cable conduit may be positioned at any appropriate location on harness 8000.

Harness 8000 as shown in FIGS. 3, 5 and 8 is an embodiment of the present invention. However, there are numerous other means that may be used to support cameras 2000 and 2900, display unit 4000, computer 5000, battery 6000, and accessory pouch 7000 from the body of the sentry. For example, a harness could be used that incorporates pockets to hold the various components. In addition, a harness could be used that has camera cases 2200 and 2700, display housing 4200, computer housing 5200, battery housing 6200, and accessory pouch 7200 fastened to the outside surface of the harness at suitable locations on the body 10 of the sentry wearing the harness as shown in FIGS. 3 and 5.

Figure 4:
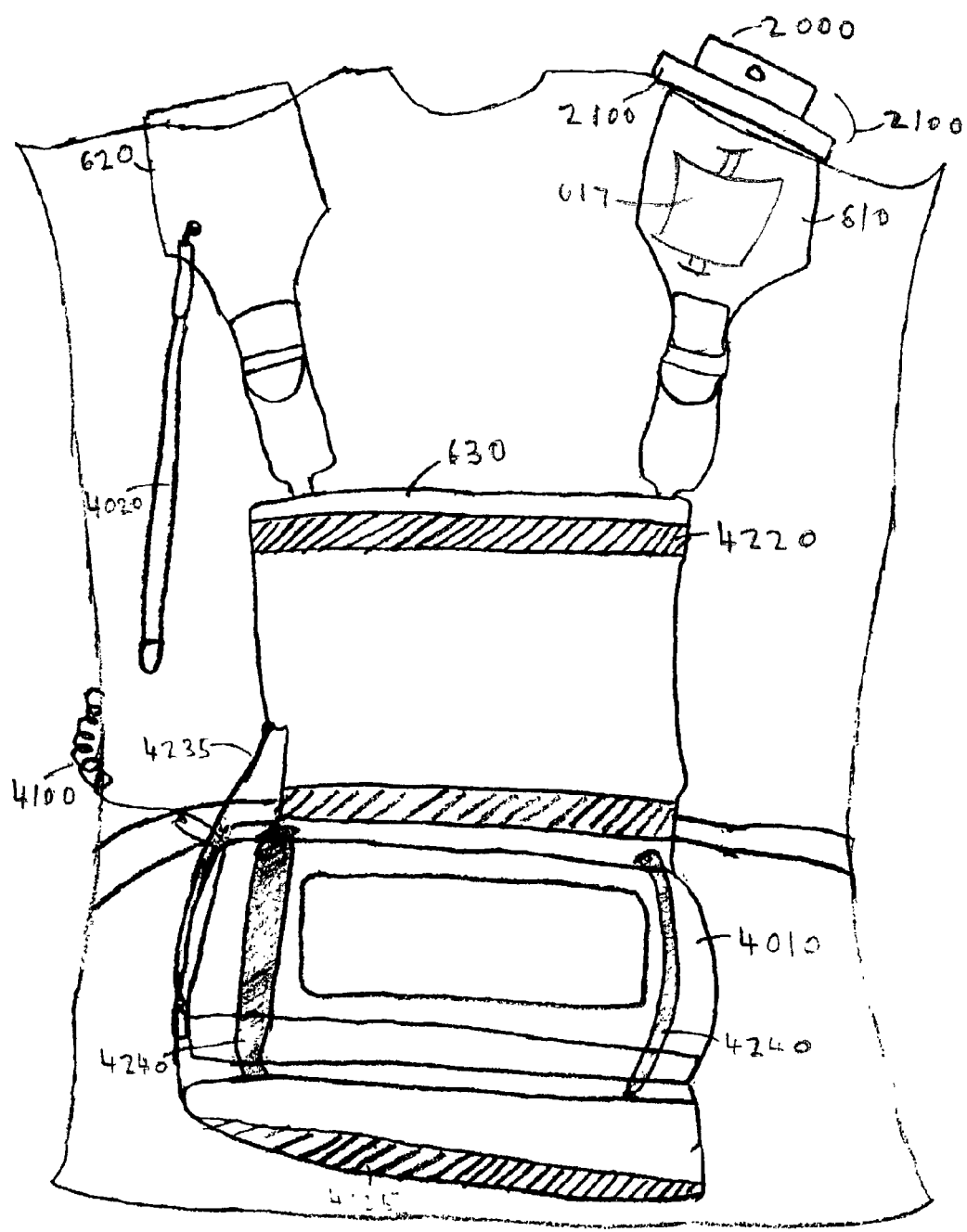
FIG. 4 is a front view of another embodiment of a wearable computer as worn on the body of a person.
Figure 6:
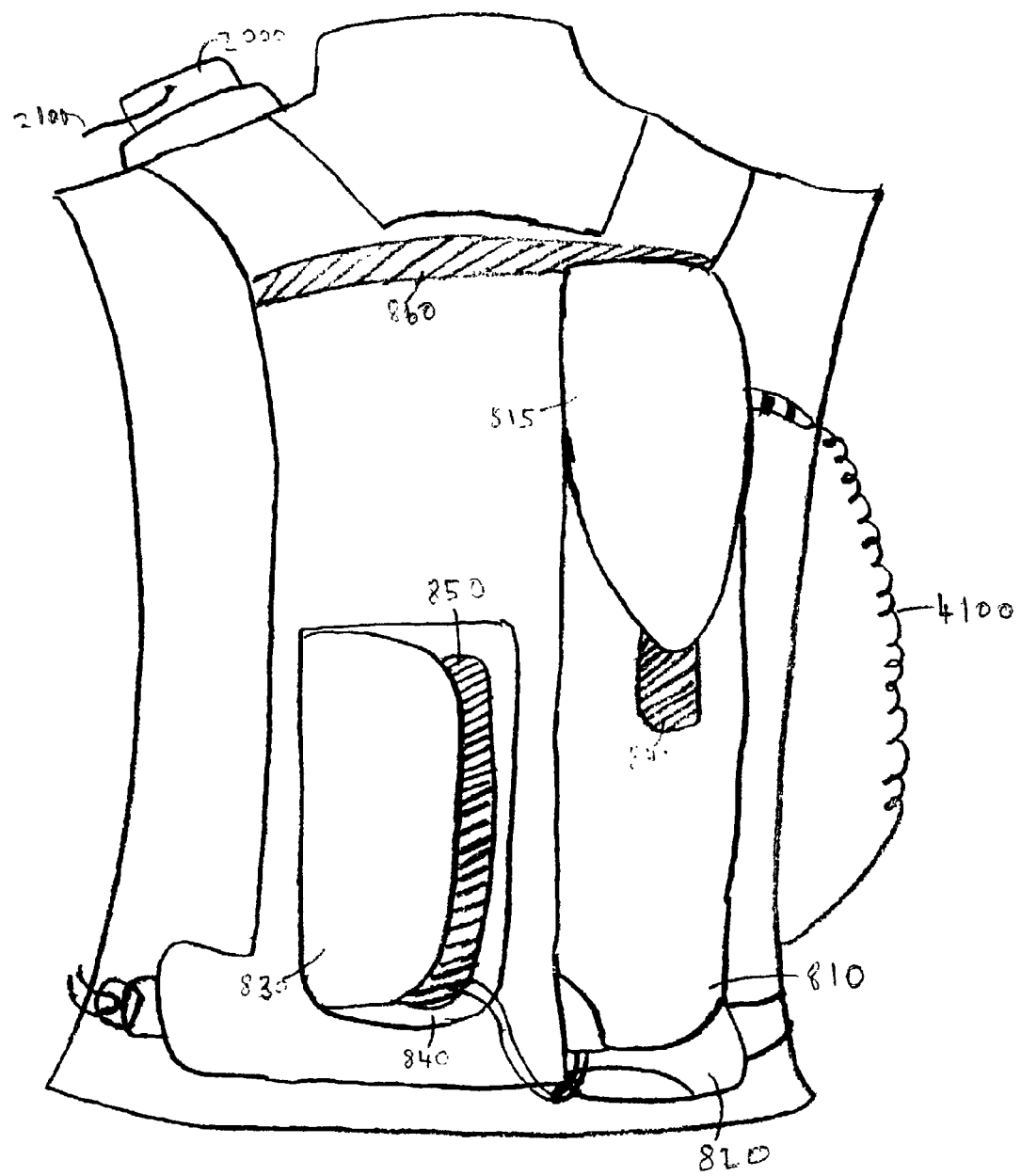
FIG. 6 is a rear view of the embodiment of the wearable computer shown in FIG. 4 as worn on the body of a person.

As shown in FIGS. 4 and 6, another embodiment of the wearable computer as worn on the body of a person is shown. In FIG. 4, two straps 610 and 620 conform over the shoulder of the sentry and connect to the wearable computer case 630. Strap 610 includes a holder 617 that holds a communications device. A pen stylus 4020 through a self-winding elastic cord permits the sentry to perform touch screen operations on computer display 4010. The "vest" design of case 630 permits greater protection to the body of the sentry while not interfering with the standard issue sentry, law enforcement, or military weapons belt (not shown). In one embodiment of the invention, "vest" 630 can be a bulletproof vest that provides ballistic protection to the sentry's chest and back area.

In FIG. 6, display 4010 couples through connector cable 4100 to wearable computer 820 present in wearable computer case 810. The wearable computer 820 can be removed from case 810 by detaching flap 815 from Velcro strip 845. Wearable computer case 810 connects to the back vest by Velcro strip 860. Wearable computer 820 is coupled to a battery supply (not shown) in battery case 840. The battery supply can be removed from battery case 840 by detaching battery flap 830 from Velcro strip 850. The battery supply may be two Molicel ME202BB batteries as described above with reference to FIG. 5. The vest shown in FIGS. 4 and 6 is designed to be worn by a 120-pound female or 250 pound male sentry. The vest can be adjusted for different human body shapes and weights using strap connectors incorporated into the vest. The vests all weather design distributes the weight of the vest and the wearable computer over the shoulders of the sentry with approximately 2.8 pounds in the back and 1.4 pounds in the front.

The embodiments of the wearable computer and accessories described above for use by a sentry in combination with the IRCWCS, as will be evident to one skilled in the art, can be modified for use by fire fighters, on-site repair technicians, paramedics, SWAT team members, members of chemical-biological response teams, and others. For various alternative applications, the IRCWCS and wearable computer system can be adapted to use phone lines, power cables, railroad tracks and the steel infrastructure of buildings (pipes, support beams, etc) as the communications infrastructure medium. Whereas the present invention has been described with respect to specific embodiments thereof, it will be understood that various changes and modifications will be suggested to one skilled in the art and it is intended that the invention encompasses such changes and modification as fall within the scope of the appended claims.

What is claimed is:

1. A portable wireless communication system, comprising:
   at least one portable data device;
   a portable wireless unit configured to be carried by hand to a first location, the portable wireless unit having a wireless access point device and a bridge device within a single case, the wireless access point device, while at the first location, being configured to wirelessly communicate with the at least one portable data device to form, at least in part, a portable wireless network;
   a network switch at a second location coupled to an existing network, the at least one portable data device being capable of communicating with the existing network via the network switch;
   a sound powered phone cable configured to physically connect the bridge device at the first location to the network switch at the second location, wherein the cable comprises an X40J phone line; and
   a cable reel in the portable wireless unit for dispensing the sound powered phone cable when the portable wireless unit is transported from the second location to the first location, the cable reel being configured to store the cable and to be transported with the portable wireless unit.

2. The system of claim 1, wherein the portable data device includes a wearable computer.

3. The system of claim 1, wherein the cable is, at least in part, portable and includes a first end coupled to the network switch and a second portable end coupled to the portable wireless unit.

4. The system of claim 1, wherein the at least one portable data device includes a plurality of portable data devices, each of the plurality of portable data devices being configured to wirelessly communicate with the other portable data devices through the portable wireless unit.

5. The system of claim 1, wherein the network switch comprises a sound powered phone jack box at the second location.

6. The system of claim 1, wherein the at least one portable data device communicates at least one of video, voice, and data communications with the existing network.

7. A method of implementing a portable wireless network, comprising:
   carrying a portable wireless unit by hand to a first location;
   dispensing a sound powered phone cable from a cable reel within the portable wireless unit as the portable wireless unit is carried to the first location, wherein the cable comprises an X40J phone line;

wirelessly connecting at least one portable data device to the portable wireless unit to form, at least in part, a wireless network at the first location, the portable wireless unit having a bridge device and a wireless access point device within a single case, the wireless access point device in wireless communication with the at least one portable data device;

connecting the bridge device to a communications circuit;

connecting the communications circuit to a network switch coupled to an existing network, the network switch being physically connected to the sound powered phone cable at a second location remote from the first location; and establishing data communication between the portable data device and the existing network via the network switch.

8. The method of claim 7, wherein establishing data communication includes transmitting data from a wearable computer to the existing network.

9. The method of claim 7, wherein the at least one portable data device includes a plurality of portable data devices and further comprising:

wirelessly connecting each of the plurality of portable data devices to the other portable data devices through the portable wireless access unit.

10. The method of claim 7, wherein the network switch comprises a sound powered phone jack box at the second location.

11. The method of claim 7, further comprising establishing at least one of video, voice, and data communications with the existing network.

12. A portable wireless communication system, comprising:

at least one portable data device;

a portable wireless unit at a first location, the portable wireless unit having a wireless access point device and a bridge device, the wireless access point device, while at the first location, being configured to wirelessly communicate with the at least one portable data device to form, at least in part, a portable wireless network;

a network switch at a second location coupled to an existing network, the at least one portable data device being capable of communicating with the existing network; and an X40J phone line configured to connect the bridge device at the first location to the network switch at the second location.

13. The system of claim 12, wherein the at least one portable data device includes a wearable computer.

14. The system of claim 12, wherein the X40J phone line is, at least in part, portable and includes a first end coupled to the network switch and a second portable end coupled to the portable wireless unit.

15. The system of claim 12, wherein the at least one portable data device includes a plurality of portable data devices, each of the plurality of portable data devices being configured to wirelessly communicate with the other portable data devices through the portable wireless unit.

16. The system of claim 12, wherein the network switch comprises a sound powered phone jack box at the second location.

17. The system of claim 12, wherein the at least one portable data device communicates at least one of video, voice, and data communications with the existing network.

18. A portable wireless communication system, comprising:

at least one portable data device;

a portable wireless unit at a first location, the portable wireless unit comprising a wireless access point device coupled to a long reach Ethernet device, the wireless access point device being configured to wirelessly communicate with the at least one portable data device to form, at least in part, a portable wireless network;

a long reach Ethernet network switch at a second location coupled to an existing network, the at least one portable data device being capable of communicating with the existing network; and a cable configured to connect the long reach Ethernet device at the first location to the long reach Ethernet network switch at the second location, wherein the cable comprises an X40J phone line.

19. The system of claim 18, wherein the at least one portable data device includes a wearable computer.

20. The system of claim 18, wherein the X40J phone line is, at least in part, portable and includes a first end coupled to the network switch and a second portable end coupled to the portable wireless unit.

21. The system of claim 18, wherein the at least one portable data device includes a plurality of portable data devices, each of the plurality of portable data devices being configured to wirelessly communicate with the other portable data devices through the portable wireless unit.

22. The system of claim 18, wherein the network switch comprises a sound powered phone jack box at the second location.

23. The system of claim 18, wherein the at least one portable data device communicates at least one of video, voice, and data communications with the existing network.

24. A method of implementing a portable wireless network, comprising:

carrying a portable wireless unit by hand to a first location, the portable wireless unit having a wireless access point device and a bridge device, the bridge device being connected to a network switch at a second location via an X40J phone line;

wirelessly connecting the wireless access point device at the first location to an at least one portable data device to form, at least in part, a portable wireless network; and coupling the network switch at the second location to an existing network, the at least one portable data device being capable of communicating with the existing network via the bridge device.

25. The method of claim 24, wherein the at least one portable data device includes a wearable computer.

26. The method of claim 24, wherein the at least one portable data device includes a plurality of portable data devices, the method further comprising:

wirelessly connecting each of the plurality of portable data devices to the other portable data devices through the portable wireless access unit.

27. The method of claim 24, wherein the network switch comprises a sound powered phone jack box at the second location.

28. The method of claim 24, further comprising establishing at least one of video, voice, and data communications with the existing network.

* * * * *